US 11,481,281 B2

(12) United States Patent
Baughman et al.

(10) Patent No.: US 11,481,281 B2
(45) Date of Patent: Oct. 25, 2022

(54) PREDICTIVE FOG COMPUTING IN AN EDGE DEVICE

(71) Applicant: INTERNATIONAL BUSINESS MACHINES CORPORATION, Armonk, NY (US)

(72) Inventors: Aaron K. Baughman, Cary, NC (US); Craig M. Trim, Ventura, CA (US); Shikhar Kwatra, Raleigh, NC (US); Melissa Restrepo Conde, Leland, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 16/898,940

(22) Filed: Jun. 11, 2020

(65) Prior Publication Data
US 2021/0390021 A1  Dec. 16, 2021

(51) Int. Cl.
*G06F 12/00* (2006.01)
*G06F 11/14* (2006.01)
(Continued)

(52) U.S. Cl.
CPC ...... *G06F 11/1453* (2013.01); *G06F 11/1461* (2013.01); *G06F 11/1469* (2013.01); *G06N 3/08* (2013.01); *H04W 64/003* (2013.01)

(58) Field of Classification Search
CPC ............. G06F 11/1453; G06F 11/1461; G06F 11/1469; G06F 3/0646; G06F 3/0647;
(Continued)

(56) References Cited

U.S. PATENT DOCUMENTS 6,910,106 B2   6/2005  Sechrest et al.
8,862,533 B2  10/2014  Raghavan
(Continued)

FOREIGN PATENT DOCUMENTS

CN   108198439 A   6/2018

OTHER PUBLICATIONS

Mell et al., "The NIST Definition of Cloud Computing", NIST, Special Publication 800-145, Sep. 2011, 7 pages.
(Continued)

*Primary Examiner* — Shawn X Gu
(74) *Attorney, Agent, or Firm* — Brian Restauro; Andrew D. Wright; Calderon Safran & Cole, P.C.

(57) ABSTRACT

A method includes: determining an amount of available storage in a user mobile device; predicting an amount of storage in the device that will be required for a future operation of the device; identifying an amount of data stored on the device that has not been previously backed up to an external storage device that is external to the device; backing up to an external backup device, a portion of the data that has not been previously backed up, the external backup device being external to the device; and deleting from the device the data that is backed up to the external backup device. A sum of an amount of the data deleted and the amount of available storage in the device is greater than the predicted amount of storage, and the backing up is performed after the predicting and automatically while the device is connected to a network.

20 Claims, 7 Drawing Sheets

(51) Int. Cl.
*H04W 64/00* (2009.01)
*G06N 3/08* (2006.01)

(58) Field of Classification Search
CPC ...... G06F 3/065; G06F 3/0652; G06F 3/0655; H04W 64/003
See application file for complete search history.

(56) References Cited

U.S. PATENT DOCUMENTS

| | | |
|---|---|---|
| 10,051,142 B1 * | 8/2018 | Villena ................ H04N 9/8042 |
| 10,108,626 B2 | 10/2018 | Charania et al. |
| 10,397,330 B2 | 8/2019 | Mo et al. |
| 10,534,525 B1 * | 1/2020 | Suchland .............. G06F 3/0481 |
| 2019/0339885 A1 | 11/2019 | Yanagihara et al. |

OTHER PUBLICATIONS

Anonymous, "Google Photos—All your photos organized and easy find", https://www.google.com/photos/about, Google, accessed Jun. 9, 2020, 4 pages.

Anonymous, "A Fog Computing Approach for Predictive Maintenance", https://link.springer.com/chapter/10.1007/978-3-030-20948-3_13, International Conference on Advanced Information Systems Engineering, Springer Link, May 14, 2019, Abstract, 5 pages.

Patman et al., "Predictive Analytics for Fog Computing Machine Learning and GENI", https://ieeexplore.ieee.org/document/8407027, IEEE Infocom 2018 Conference, Abstract, 2 pages.

\* cited by examiner

PREDICTIVE FOG COMPUTING IN AN EDGE DEVICE

BACKGROUND

Aspects of the present invention relate generally to storage space in mobile devices and, more particularly, to managing data stored on a mobile computing device to ensure sufficient storage space is available for projected future storage needs.

Many people use mobile user devices such as, for example, smart phones, tablets, and digital cameras, that have the capability to capture and store still images and/or video images. Some of these mobile devices also have computing capabilities.

SUMMARY

In a first aspect of the invention, there is a computer-implemented method including: determining, by a computing device, an amount of available storage in a user mobile device by analyzing the user mobile device; predicting, by the computing device, an amount of storage in the user mobile device that will be required for a future operation of the user mobile device; identifying, by the computing device, an amount of data stored on the user mobile device that has not been previously backed up to an external storage device, the external storage device being external to the user mobile device; backing up, by the computing device and to an external backup device, a portion of the data that has not been previously backed up, the external backup device being external to the user mobile device; and deleting, by the computing device, from the user mobile device the data that is backed up to the external backup device. A sum of an amount of the data deleted and the amount of available storage in the user mobile device is greater than the predicted amount of storage, and the backing up is performed after the predicting and automatically while the user mobile device is connected to a network.

In another aspect of the invention, there is a computer program product including one or more computer readable storage media having program instructions collectively stored on the one or more computer readable storage media. The program instructions are executable to: determine an amount of available storage in a user mobile device by analyzing the user mobile device; predict an amount of storage in the user mobile device that will be required for a future operation of the user mobile device; identify an amount of data stored on the user mobile device that has not been previously backed up to an external storage device, the external storage device being external to the user mobile device; back up to an external backup device a portion of the data that has not been previously backed up, the external backup device being external to the user mobile device; and delete from the user mobile device the data that is backed up to the external backup device. A sum of an amount of the data deleted and the amount of available storage in the user mobile device is greater than the predicted amount of storage, the external back up device is another mobile device, and the backing up is performed after the predicting and automatically while the user mobile device is wirelessly connected to the other mobile device.

In another aspect of the invention, there is system including a processor, a computer readable memory, one or more computer readable storage media, and program instructions collectively stored on the one or more computer readable storage media. The program instructions are executable to: determine an amount of available storage in a user mobile device by analyzing the user mobile device; predict an amount of storage in the user mobile device that will be required for a future operation of the user mobile device, the future operation being at a location outside of any network that is connected to the Internet; identify an amount of data stored on the user mobile device that has not been previously backed up to an external storage device, the external storage device being external to the user mobile device; back up to an external backup device a portion of the data that has not been previously backed up, the external backup device being external to the user mobile device; and delete from the user mobile device the data that is backed up to the external backup device. A sum of an amount of the data deleted and the amount of available storage in the user mobile device is greater than the predicted amount of storage, and the backing up is performed after the predicting.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to storage space in mobile devices and, more particularly, to managing data stored on a mobile computing device to ensure sufficient storage space is available for projected future storage needs. According to aspects of the invention a computing device analyzes a user mobile device to determine if a future operation of the user mobile device will require more storage space than is currently available on the user mobile device. In embodiments, the computing device automatically analyzes the data stored on the user mobile device to determine what data of the data stored on the user mobile device has not yet been backed up. The computing device then automatically backs up a portion of the data that has not yet been backed up and deletes a portion of the data on the user mobile device that has been backed up. In this manner, implementations of the invention provide a user of the user mobile device with sufficient storage space on the user mobile device for the predicted future operation.

It is desirable to have data as close as possible to an algorithm that processes the data. Edge computing is a distributed computing paradigm which brings computation and data storage closer to the location where it is needed. Edge computing can improve response times and save bandwidth. Edge computing is moving many processing capabilities from data centers and other processing locations to mobile devices. Fog computing, or fogging, is an architecture that uses edge devices to carry out a substantial amount of computation, storage, and communication locally. Although the terms edge computing and fog computing are often used interchangeably, fog computing is a subset of edge computing.

Embodiments of the invention include a computer-implemented method including: predicting an amount of storage in a device (e.g., mobile or edge device) that is required during usage of one or more applications; identifying an amount of data being stored on the device that has not yet been backed up; and proactively backing up data being stored on the device in response to the device being connected to a WiFi network. In embodiments, the predicting an amount of storage in a device (e.g., mobile device) that is required during usage of one or more applications includes performing predictive fogging based on algorithms on the device, chip architecture, and disk space. In embodiments, the proactively backing up data being stored on the device in response to the device being connected to a WiFi network includes parallelizing fog tasks between devices in proximity so that edge servers can stage data as required. Embodiments further include: predicting storage availability; and providing a caching/deletion mechanism based on cognitive heuristics infused with event/travel itineraries for a plurality of people using Internet of Things (IoT) sensor data normalization and data segregation across multiple layers in IoT-edge-cloud framework.

Implementations of the invention have a practical application of automatically providing a user of a user mobile device with sufficient storage space on the user mobile device for a predicted future operation. Also, implementations of the invention improve the functioning of a computer by automatically providing a user of a user mobile device with sufficient storage space on the user mobile device for a predicted future operation.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In many situations, available computing capacity and storage space in mobile devices becomes a critical issue. Mobile devices receive different types of content in varying formats (text, audio, video) which are stored/cached in the mobile devices and, accordingly, available storage space is consumed very rapidly. For example, a user may need and/or desire to capture photographs, video, audio, and other types of data while visiting a new and/or interesting place. The number of photographs and videos captured can depend on the user's habits of capturing photographs, and the surrounding context. For example, a user that routinely takes a large number of photographs is expected to take a large number of photographs when the user visits a location frequently visited by tourists. As a result, the user should have appropriate storage space in the mobile device to accommodate the number of photographs that the user is expected to take. Backing up and deleting existing data such as, for example, photographs that exist on the mobile device provides added storage space. However, real-time cloud (or other) backup may not be possible in every location due to a lack of availability of a network.

Embodiments of the invention use artificial intelligence (AI) to predict future storage space requirements in a mobile device and proactively provide the predicted required storage space in the mobile device. Embodiments provide the predicted required storage space by proactively invoking efficient backup of existing data on the mobile device when the mobile device is connected to a WiFi network.

Embodiments of the invention include fog computing that is predictive based on mobile device storage space and algorithm potential. Embodiments include applying the methods in this disclosure to server space management with AI and, accordingly, the initiation of internal file transfer.

Embodiments include performing predictive fog computing based on algorithms that are on the mobile device, chip architecture of the mobile device, and disk space of the mobile device. Embodiments include parallelizing fog tasks between mobile devices in proximity to each other so that edge servers can stage data moving between the mobile devices as needed to optimize the fog computing. Embodiments include predictive space availability and a caching/deletion mechanism based on cognitive heuristics infused with event/travel itineraries for a plurality of people using IoT sensor data normalization and data segregation across multiple layers in the IoT-edge-cloud framework.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
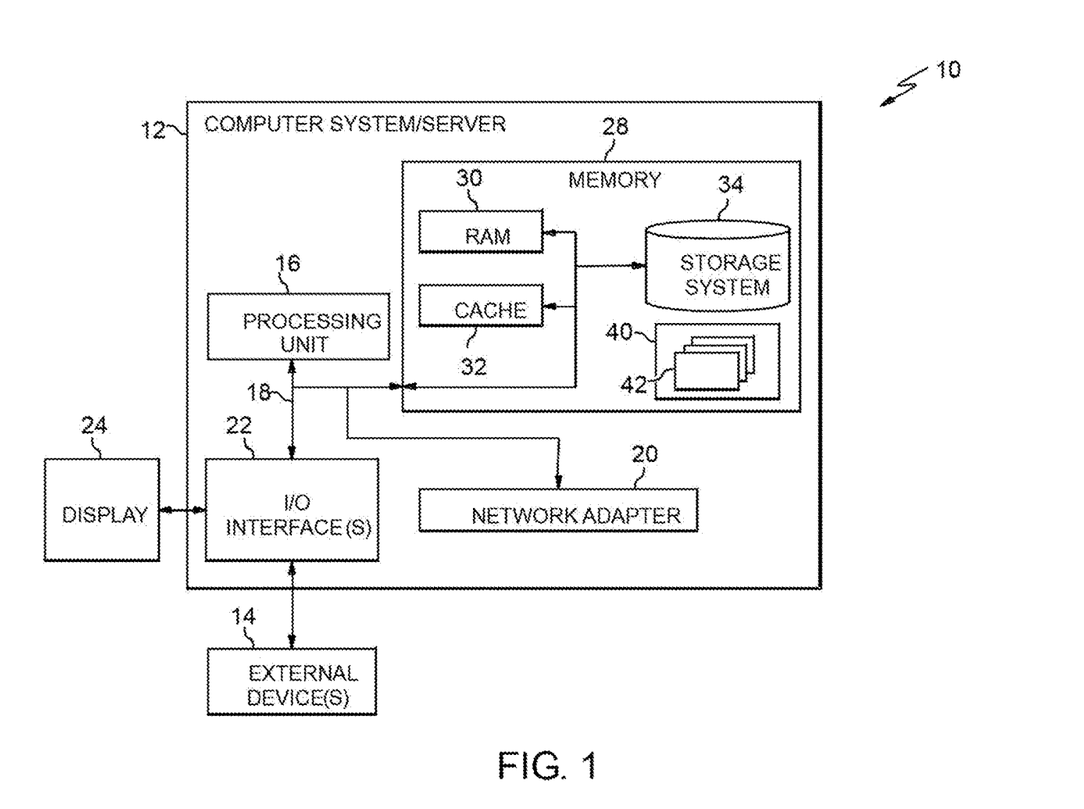
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
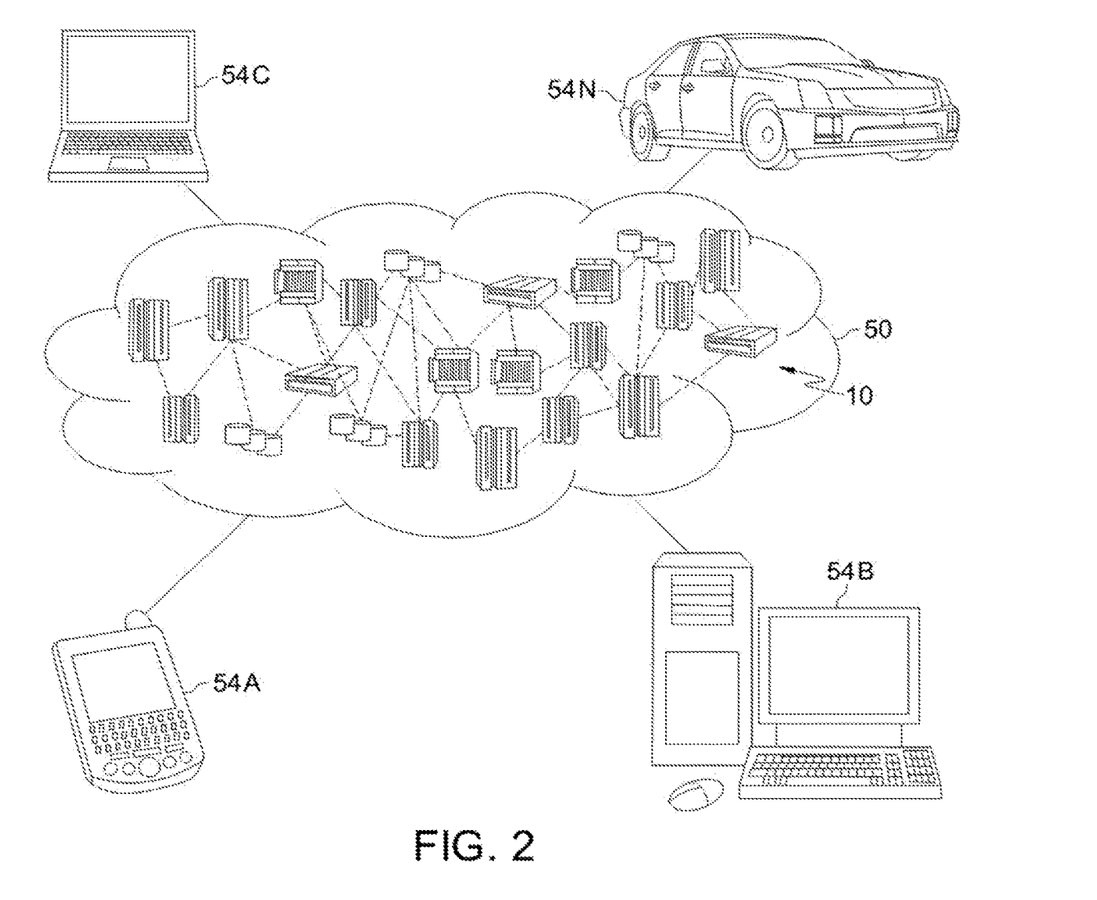
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
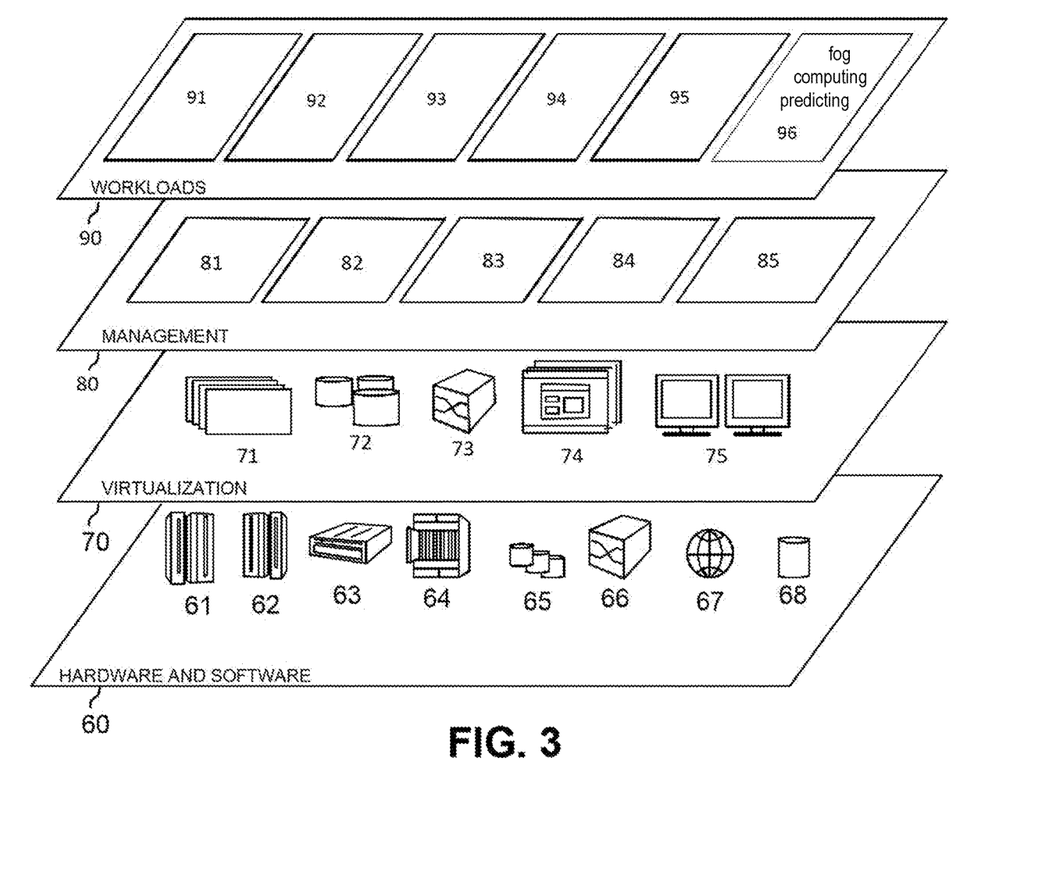
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fog computing predicting 96.

Implementations of the invention may include a computer system/server 12 of FIG. 1 in which one or more of the program modules 42 are configured to perform (or cause the computer system/server 12 to perform) one of more functions of the fog computing predicting 96 of FIG. 3. For example, the one or more of the program modules 42 may be configured to: analyze a user mobile device to determine an amount of available storage in the user mobile device; predict an amount of storage in the user mobile device that will be required for a future operation of the user mobile device; identify an amount of data stored on the user mobile device that has not been backed up to an external storage device, the external storage device being external to the user mobile device; back up to an external backup device a portion of the data that has not been backed up, the external backup device being external to the user mobile device; and delete from the user mobile device the data that is backed up to the external backup device.

Figure 4:
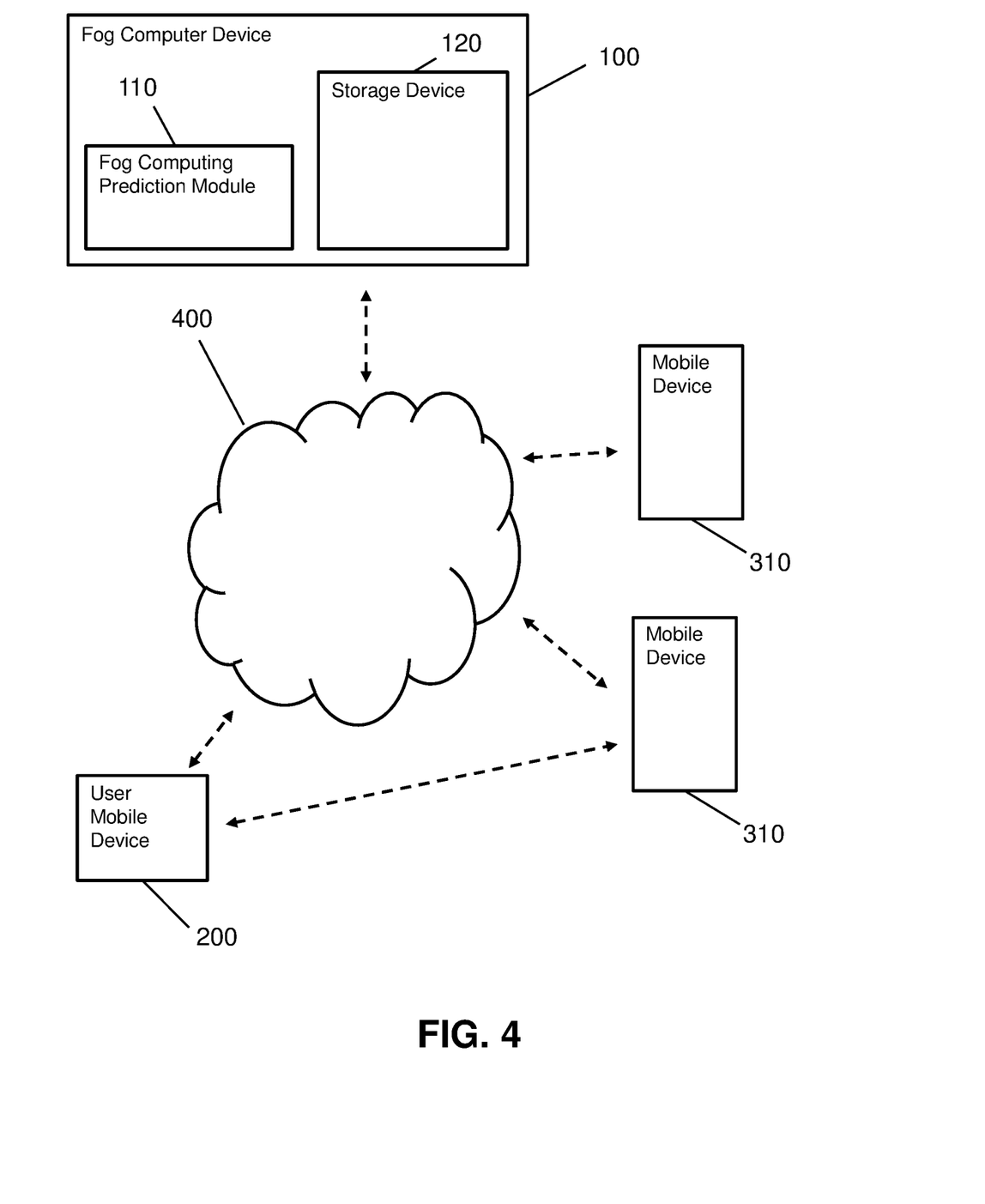
FIG. 4 shows a block diagram of an exemplary environment in accordance with aspects of the invention.

FIG. 4 shows a block diagram of an exemplary environment in accordance with aspects of the invention. In embodiments, the environment includes a fog computer device 100 such as, for example, computer system/server 12 in FIG. 1, that communicates over one or more networks 400 such as, for example, cloud computing environment 50. In this example, fog computer device 100 includes a fog computing prediction module 110, for example, one or more of program modules 42 in FIG. 1, and a storage device 120 such as, for example, storage system 34 in FIG. 1. In embodiments, fog computing device 100 exists between smart end devices (such as user mobile devices or other mobile devices) and traditional cloud servers or data centers. In embodiments, fog computing device 100 exits between smart end devices and a cloud network, such as, for example, network 400, and acts as an entry point for the smart end devices into the cloud network.

FIG. 4 shows a user mobile device 200 that is, in embodiments, a smart phone or some other mobile electronic device. FIG. 4 shows two mobile devices 310 such as, for example, other mobile computer devices having some or all of the features of computer system/server 12 in FIG. 1, that are external to fog computer device 100 and contain processing capability and/or storage space that fog computing prediction module 110 accesses. Other examples include fewer or more than two mobile devices 310. As shown in FIG. 4, user mobile device 200 communicates with mobile device 310 through network 400 and/or directly. In embodiments, storage device 120 is a backup device that is directly wirelessly connected to user mobile device 200. In embodiments, one or more mobile devices 310 are directly wirelessly connected to user mobile device 200, as shown in FIG. 4. The term directly wirelessly connected is understood to mean that the devices are in direct communication with each other without going through a network such as, for example, network 400.

In embodiments, fog computer device 100 comprises fog computing prediction module 110, which may comprise one or more program modules such as program modules 42 described with respect to FIG. 1. Fog computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
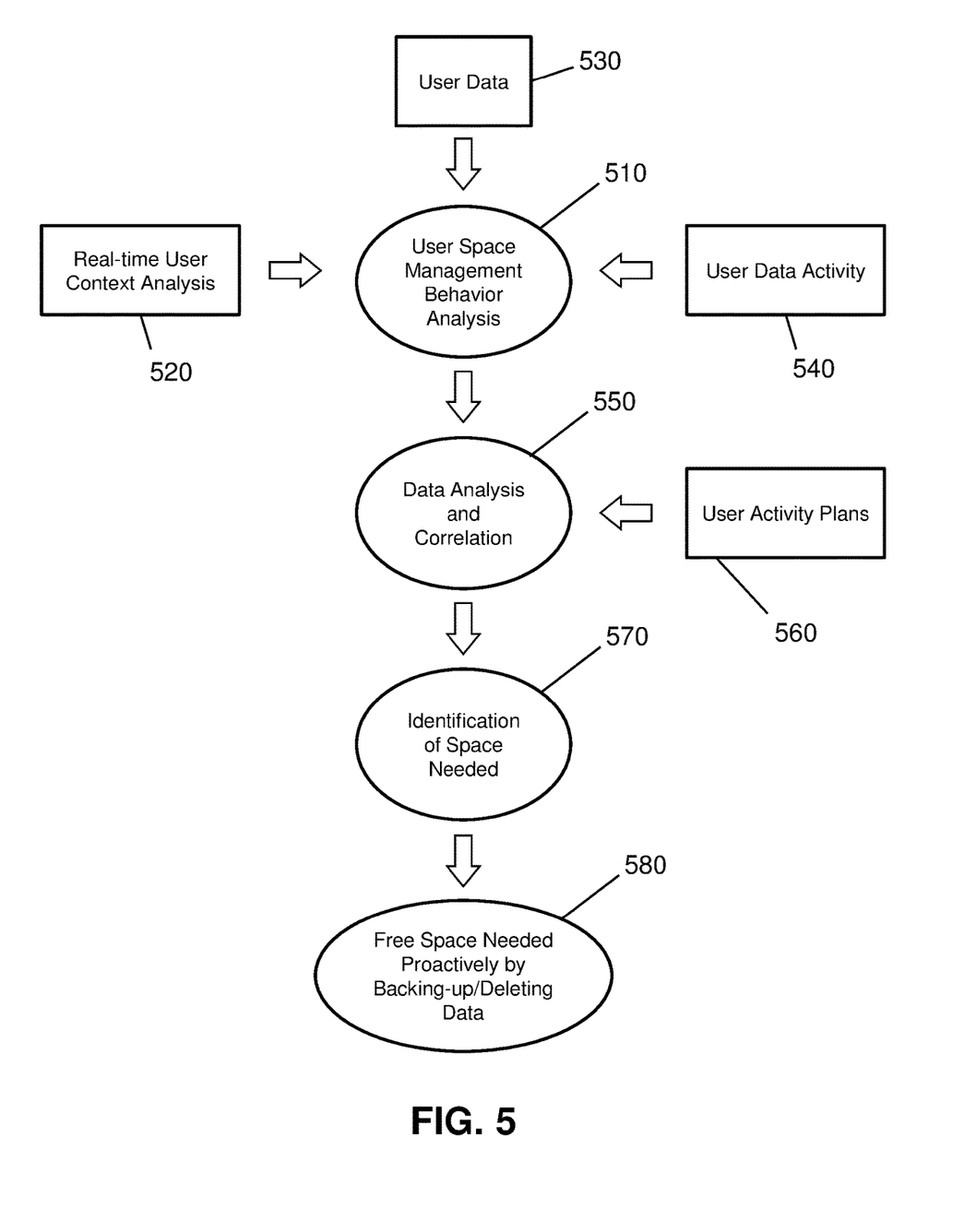
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 510, the system analyzes user space management behavior of the user based on real-time user context analysis step 520, user data 530, and user data activity 540. Examples of real-time user context analysis step 520 include the location of the user, the activity of the user, other people that are around the user, and whether the user is using a device that affects the usage of user mobile device 200 (such as, for example, a camera). Examples of user data 530 include images (such as photographs and videos) and the metadata and file size of the images. Examples of user data activity 540 include the user deleting photographs and/or messages, the user analyzing images, and other activity of the user related to user data. In embodiments, and as described with respect to FIG. 4, fog computing prediction module 110 analyzes the user space management of the storage space on user mobile device 200 by, for example, using visual recognition to recognizing patterns in the images, using natural language processing (NLP) to recognize patterns in messages and other text data, and running analytics on the data (whether images or text) to find patterns in the data. Based on this analysis, fog computing prediction module 110 determines connections between: (1) the data stored on user mobile device 200; (2) the data activities of the user (deleting, analyzing, etc.); and (3) the context in which the user data was acquired and/or manipulated (deleted, analyzed, etc.). In embodiments, fog computing prediction module 110 determines patterns of user behavior relative to data stored on user mobile device 200 based on the connections.

At step 550 and based on the analysis from step 510, fog computing prediction module 110 performs data analysis to find correlations between the behaviors determined in step 510 and user activity plans step 560 using, for example, NLP and analytics. In embodiments, fog computing prediction module 110 determines user activity plans step 560 by analyzing calendars, travel itineraries, and other indications of future plans of the user stored on user mobile device 200. At step 570, fog computing prediction module 110 uses the correlations found in step 550 to predict future storage space needs based on future activities. For example, in embodiments, fog computing prediction module 110 predicts that the user will need a particular amount of storage on mobile device 200 on a certain date because the user has plans to visit a monument on the certain date and historical data shows that the user usually takes a large number of photographs when the user visits monuments. In embodiments, the predicting is based on travel itineraries of a plurality of other user mobile devices such as, for example, mobile devices 310. For example, in embodiments, fog computing prediction module 110 analyzes data on one or more mobile devices 310 to determine travel plans (itineraries) of those mobile devices 310 and to determine if the itineraries of those mobile devices 310 have any events in common with the itinerary of user mobile device 200. In embodiments, fog computing prediction module 110 predicts that less storage space is needed when multiple mobile devices share an itinerary and historical data shows that user mobile device 200 uses less storage when these multiple mobile devices are operated at a common event.

At step 580, fog computing prediction module 110 frees storage space needed on user mobile device 200 by proactively deleting and/or backing up and deleting data stored on user mobile device 200. In embodiments, fog computing prediction module 110 determines how much data needs to be deleted and/or backed up and deleted by comparing the predicted future storage space needs and the currently available storage space. In embodiments, fog computing prediction module 110 determines which data stored on user mobile device 200 to back up and delete based on the behavior analysis in step 510. For example, in embodiments, fog computing prediction module 110 determines that data that is similar to particular types of images is relatively important because the user has manipulated that type of image in the past and, as a result, fog computing prediction module backs up that data to storage device 120 and deletes it from user mobile device 200.

In embodiments, in response to fog computing prediction module 110 determining that particular data is important, fog computing prediction module backs up the particular data, but does not delete it from user mobile device 200, choosing instead to delete other data that is on user mobile device 200. In embodiments, fog computing prediction module 110 determines that it will backup and/or delete only a portion of the data on user mobile device 200. For example, in embodiments, fog computing prediction module 110 determines a level of importance for some or all of the data that has not been previously backed up and backs up the data that has a highest importance level. In embodiments, fog computing prediction module 110 backs up all data that has not been previously backed up and has an importance level above a threshold importance level. In embodiments, fog computing prediction module 110 assigns importance levels to the data based on, for example, whether the user has manipulated the data. In embodiments, the user assigns importance levels to the data or user mobile device 200 automatically assigns importance levels based on, for example, length of time since the data was last accessed. In embodiments, fog computing prediction module 110 deletes the data that has a lowest importance level. In embodiments, fog computing prediction module 110 deletes all backed up data that has an importance level below a threshold importance level.

In embodiments, the predicting an amount of storage in a device (for example, user mobile device 200) that is required during usage of one or more applications includes performing predictive fogging based on algorithms on the device, chip architecture, and disk space. For example, in embodiments, fog computing prediction module 110 determines what algorithms present on user mobile device 200 are used by the one or more applications, how much processing is required by those algorithms based on the architecture of the processing chip in user mobile device 200, and/or the amount of storage used by the applications.

In embodiments, fog computing prediction module 110 proactively backs up data stored on user mobile device 200 in response to user mobile device 200 being connected to a Wi-Fi network. In embodiments, the proactive backing up includes parallelizing fog tasks between devices (for example, mobile devices 310) in proximity of user mobile device 200 to allow fog computing prediction module 110 to stage data as required. For example, fog computing prediction module 110 performs fog tasks on user mobile device 200 and mobile device 310 in parallel to allow fog computing prediction module 110 to more quickly and efficiently perform the proactive backing up of the data. In embodiments, fog computing prediction module 110 provides a caching/deletion mechanism based on cognitive heuristics infused with event/travel itineraries for a plurality of people (for example, the user of user mobile device 200 and the users of mobile devices 310) using IoT sensor data normalization and data segregation across multiple layers in the IoT-edge-cloud framework.

In embodiments, fog computing prediction module 110 uses historical needs of storage space (inclusive of photography, videography, etc.) and a deep learning neural network algorithm (such as, for example, a long short-term memory recurrent neural network (LSTM-RNN) algorithm) to predict an amount of storage space in user mobile device 200 that will be required for a particular event. In embodiments, the algorithm uses parameters such as: historical photograph and video capturing patterns; calendar data; available space on user mobile device 200; a duration for which the user is planning to stay at the event; and characteristics of other users that are attending the event to perform the prediction. The input parameters (for example, those listed above) ingested by the algorithm enable fog computing prediction module 110 to predict the amount of storage space in user mobile device 200 required by the user for the particular event in a proactive fashion, and accordingly, ensure availability of storage space for the particular activity. As a result, fog computing prediction module 110 predicts a predicted travel plan and a predicted storage space requirement for the predict travel plan.

In embodiments, content is selectively deleted in accordance with the following method. Steps of the method may be carried out in the environment of FIG. 4 and are described with reference to elements depicted in FIG. 4. In embodiments, using historical content deletion patterns (determined, for example, in step 510 of FIG. 5), fog computing prediction module 110 dynamically identifies which files in user mobile device 200 to delete when fog computing prediction module 110 predicts that the user will need more free storage space than currently exists on user mobile device 200. In embodiments, fog computing prediction module 110 identifies which existing content (inclusive of real-time communication messages in some embodiments) is to be deleted and which content is to be backed up and deleted (for example, backed up on a cloud computing network such as cloud computing environment 50 shown in FIG. 2). Fog computing prediction module 110 performs this process by applying an object detection algorithm to images stored in user mobile device 200. One example of an object detection algorithm used by fog computing prediction module 110 is K-means clustering implemented on a fast convolutional neural network (CNN) to categorize the images in a descriptive format and extract the similarity between various images including the ones which would be most appealing to the user based on previous likes, storing, and/or sharing of the content. Another example of an object detection algorithm used by fog computing prediction module 110 is a CNN-LSTM such as, for example, the CNN-LSTM shown in FIG. 6, which will be explained below.

The above characterization of images enables fog computing prediction module 110 to track what types of photographs/videos the user is capturing, including type (based on a description extracted by the object detection algorithm) and respective sizes of the individual photographs/videos. As a result, fog computing prediction module 110, using historical learning (as described above), determines which data on user mobile device 200 is appropriate for deletion and which should be retained.

Figure 6:
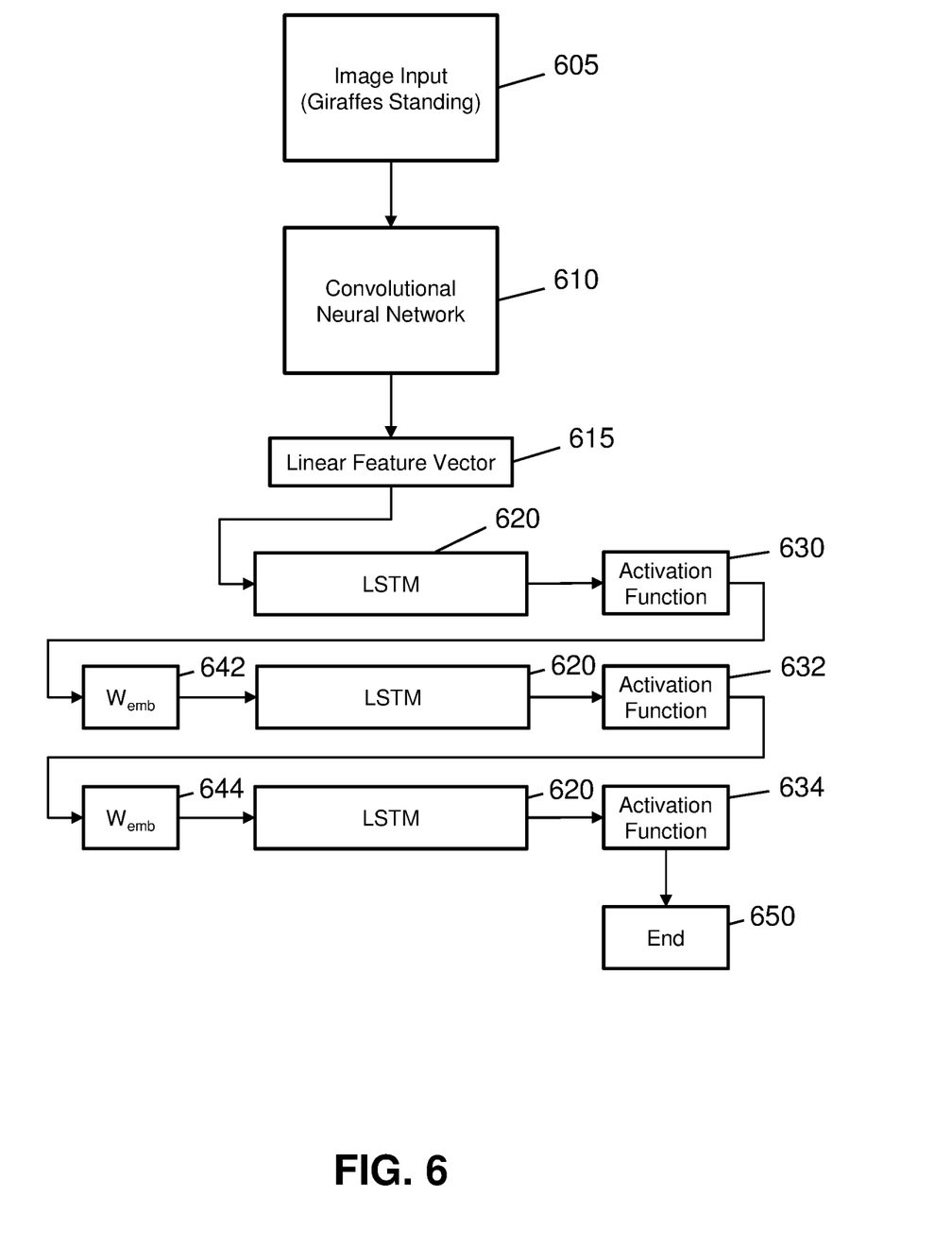
FIG. 6 shows an exemplary method in accordance with aspects of the invention.

As stated above, FIG. 6 shows an example of a CNN-LSTM used by fog computing prediction module 110 as the object detection algorithm. At step 605, the system receives an image input. In embodiments, and as described with respect to FIG. 4, the fog computing prediction module 110 receives an image that is stored in user mobile device 200. In this example, the image is a photograph of multiple giraffes standing.

At step 610 a CNN compresses a matrix of pixels that represent the image into a linear feature vector step 615. An LSTM step 620 then ingests the linear feature vector and processes the linear feature vector using an activation function step 630 to produce an embedded word $W_{emb}$ step 642 that represents an attribute of the image (in this example "giraffes"). Embedded word $W_{emb}$ step 642 is then fed into LSTM step 620, which processes embedded word $W_{emb}$ step 642 using an activation function step 632 to produce an embedded word $W_{emb}$ step 644 that represents another attribute of the image (in this example "standing"). Embedded word $W_{emb}$ step 644 is then fed into LSTM step 620, which processes embedded word $W_{emb}$ step 644 using an activation function step 634 to determine if activation function step 634 can produce another attribute of the image. In this example, activation function step 634 determines that it cannot produce another attribute of the image and ends the process at step 650. In this example, fog computing prediction module 110 uses one LSTM step 620. However, in other examples, fog computing prediction module 110 uses more than one LSTM. In this example, fog computing prediction module 110 uses three different activation functions steps 630, 632, 634. In other examples, fog computing prediction module 110 uses fewer or more than three activation functions.

In embodiments, fog computing prediction module 110 performs a selective caching operation when it predicts that user mobile device 200 is going to be at an event in a location where either no WiFi exists or the existing WiFi at that location does not have the speed required to perform the desired backup. In embodiments, fog computing prediction module 110 ensures that data that has not previously been backed up is backed up before fog computing prediction module 110 deletes that data. In embodiments, fog computing prediction module 110 predicts when user mobile device 200 will have access to WiFi with sufficient speed. In embodiments, fog computing prediction module 110 makes this prediction by comparing a predicted future schedule of user mobile device 200 and results of polling WiFi networks at locations on the predicted future schedule. Accordingly, fog computing prediction module 110 backs up the required data to, for example, a cloud server, and deletes the data so that available storage space is created in user mobile device 200 for the predicted need of the user. In embodiments, fog computing prediction module 110 uses historical learning to dynamically allocate storage space in user mobile device 200 for different events/activities that fog computing prediction module 110 has predicted. As a result, fog computing prediction module 110 autonomously ensures that the user will have the required storage space while capturing photographs, for example.

In embodiments, fog computing prediction module 110 coordinates multi-device collaboration via Message Queuing Telemetry Transport (MQTT) protocol, for example, and by analyzing aggregated disk space requirement of multiple mobile devices 200, 310. Accordingly, in embodiments, data is shared in different mobile devices 200, 310 so that a storage space requirement of one or more of the different mobile devices 200, 310 is achieved. As a result, when the user starts using user mobile device 200 for the predicted need, fog computing prediction module 110 has previously proactively ensured that user mobile device 200 has the required storage space available. In embodiments, fog computing prediction module 110 performs the above multi-device collaboration between user mobile device 200 and a tablet or other device of the user and/or tablets or other devices of other users. In embodiments, another user provides authorization to fog computing prediction module 110 to use storage space on that user's device.

Embodiments detect other devices to collaborate with in order to secure the required storage space. For example, a first user takes a large number of photographs when they travel to another country. However, when the first user has their professional camera with them, it is very likely that the first user will not use their smart phone for taking photographs. As a result, less storage space is needed on the first user's smart phone than is usually needed. In this example, fog computing prediction module 110 identifies a second user as a user that requires more storage space than the second user's mobile device has available and proactively coordinates multi-device collaboration between the mobile devices of the first and second users.

In embodiments, fog computing prediction module 110 predicts a first user's storage space need as three times their normal need when the first user travels with two particular friends (who are also users). This added need for storage space results from the first user taking three times as many photographs with their smart phone than usual because the friends use the first user's smart phone due to its high resolution. In this case, fog computing prediction module 110 analyses and correlates data using social network geo-location and visual recognition of the friends.

In embodiments, fog computing prediction module 110 identifies objects and/or people in photographs taken by a user and determines that other similar photographs are usually deleted after the user sends them to friends or posts them on social media, for example. In this case, fog computing prediction module 110 deletes the photographs when storage space is needed for a predicted activity/event.

Although exemplary embodiments have been discussed addressing a need for additional storage space for predicted photographs or other data, it is noted that embodiments of the invention also apply to a need for additional storage space to run a predicted application or program. Although exemplary embodiments have been discussed as operating over a WiFi network, other embodiments operate over another type of network such as, for example, a cellular communication network.

Figure 7:
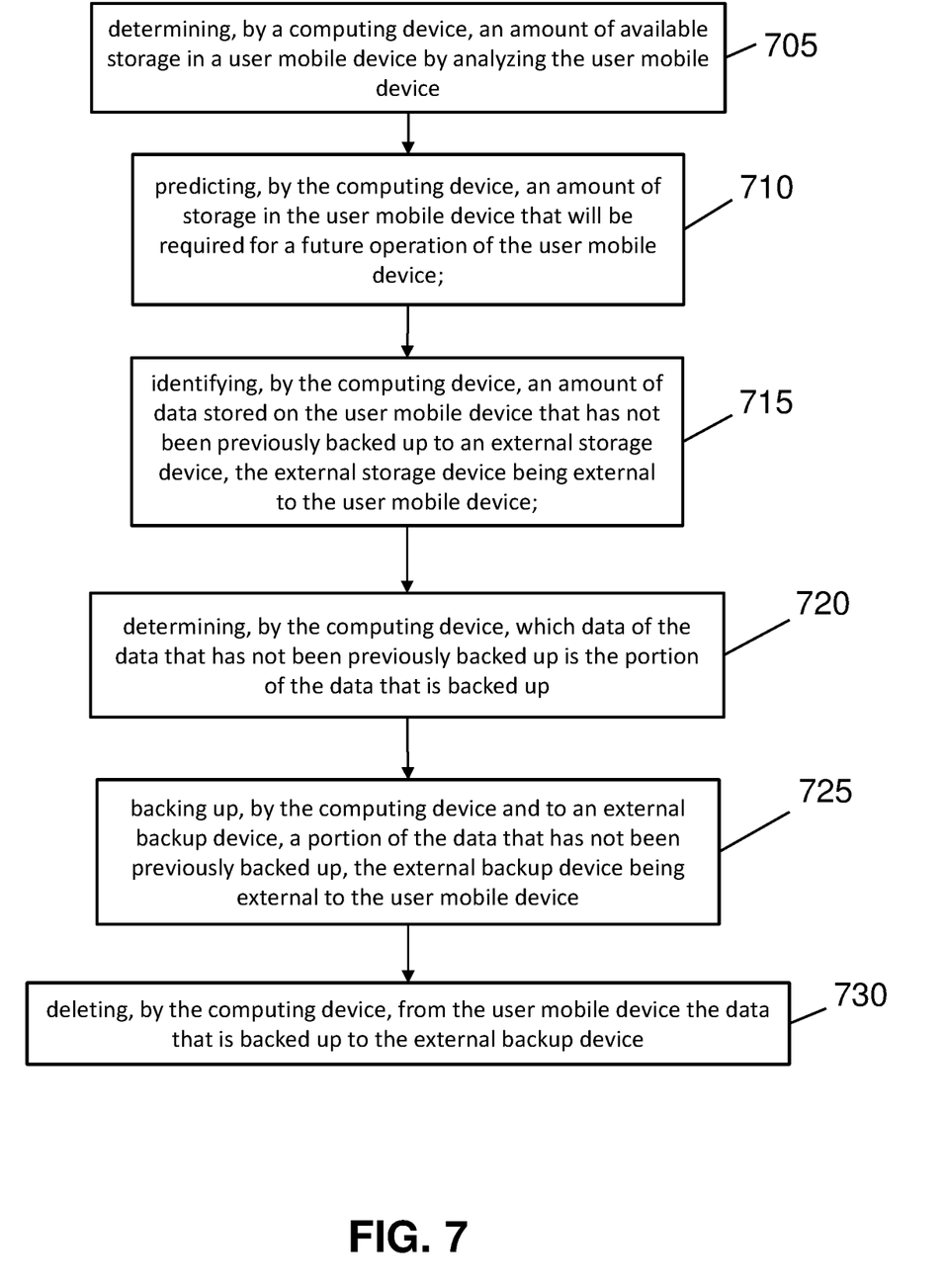
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 705, the system analyzes, by a computing device, a user mobile device to determine an amount of available storage in the user mobile device. In embodiments, and as described with respect to FIGS. 4-6, fog computing prediction module 110 analyzes user mobile device 200 to determine an amount of available storage in user mobile device 200. For example, in embodiments, fog computing prediction module 110 accesses a storage control section of user mobile device 200 to extract information pertaining to the amount of storage available in a storage section of user mobile device 200.

At step 710, the system predicts, by the computing device, an amount of storage in the user mobile device that will be required for a future operation of the user mobile device. In embodiments, and as described with respect to FIGS. 4-6, fog computing prediction module 110 predicts an amount of storage in user mobile device 200 that will be required for a future operation of user mobile device 200. In embodiments, as a result of the future operation being at a location outside of any network that is connected to the Internet, user mobile device 200 cannot connect to the Internet to perform data back up at that location.

At step 715, the system identifies, by the computing device, an amount of data stored on the user mobile device that has not been backed up to an external storage device, the external storage device being external to the user mobile device. In embodiments, and as described with respect to FIGS. 4-6, fog computing prediction module 110 identifies an amount of data stored on user mobile device 200 that has not been backed up to storage device 120, storage device 120 being external to user mobile device 200. For example, in embodiments, fog computing prediction module 110 accesses the storage control section of user mobile device 200 to extract information pertaining to the amount of data in the storage section of user mobile device 200 that has not been previously backed up.

At step 720, the system determines, by the computing device, which data of the data that has not been previously backed up is the portion of the data that is backed up. In embodiments, and as described with respect to FIGS. 4-6, fog computing prediction module 110 determines which data of the data on user mobile device 200 that has not been previously backed up is the portion of the data that is backed up in step 725 (below).

At step 725, the system backs up, by the computing device and to an external backup device, a portion of the data that has not been previously backed up, the external backup device being external to the user mobile device. In embodiments, and as described with respect to FIGS. 4-6, fog computing prediction module 110 backs up to storage device 120, a portion of the data that has not been previously backed up, storage device 120 being external to user mobile device 200.

At step 730, the system deletes, by the computing device, from the user mobile device the data that is backed up to the external backup device. In embodiments, and as described with respect to FIGS. 4-6, fog computing prediction module 110 deletes from user mobile device 200 the data that is backed up to storage device 120. In embodiments, fog computing prediction module 110 deletes a portion of the backed up data, where the portion is less than all of the backed up data.

In embodiments, the sum of an amount of the data deleted and the amount of available storage in user mobile device 200 (step 705) is greater than or equal to the predicted amount of storage that will be required (step 710). In embodiments, fog computing prediction module 110 performs the backing up after the predicting and automatically while user mobile device 200 is connected to a network such as, for example, network 400.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computing device, an amount of available storage in a user mobile device by analyzing the user mobile device;
    predicting, by the computing device, an amount of storage in the user mobile device that will be required for a future operation of the user mobile device, wherein the predicting is based on travel itineraries of a plurality of other user mobile devices;
    identifying, by the computing device, an amount of data stored on the user mobile device that has not been previously backed up to an external storage device, the external storage device being external to the user mobile device;
    backing up, by the computing device and to an external backup device, a portion of the data that has not been previously backed up, the external backup device being external to the user mobile device; and
    deleting, by the computing device, from the user mobile device the data that is backed up to the external backup device,
    wherein a sum of an amount of the data deleted and the amount of available storage in the user mobile device is greater than the predicted amount of storage, and
    the backing up is performed after the predicting and automatically while the user mobile device is connected to a network.

2. The method of claim 1, wherein the future operation is capturing an image.

3. The method of claim 1, wherein the network is a WiFi network.

4. The method of claim 1, wherein the predicting is based on planned travel of a user of the user mobile device.

5. The method of claim 4, wherein the computing device obtains the planned travel of the user from a calendar in the user mobile device.

6. The method of claim 1, further comprising determining, by the computing device, which data of the data that has not been previously backed up is the portion of the data that is backed up.

7. The method of claim 6, wherein the determining which data is the portion of the data that is backed up comprises categorizing the data using an object detection algorithm.

8. The method of claim 7, wherein the object detection algorithm is K-means clustering implemented on a convolutional neural network (CNN).

9. The method of claim 7, wherein the object detection algorithm is a convolutional neural network long short-term memory (CNN-LSTM) algorithm.

10. The method of claim 1, wherein the external backup device is a storage device located in a cloud computing network.

11. The method of claim 1, wherein the external backup device is a computing device that is directly wirelessly connected to the user mobile device.

12. The method of claim 1, wherein the future operation is at a location outside of any network that is connected to the Internet.

13. The method of claim 1, further comprising:
    identifying a portion of the data that has not been previously backed up as data to back up and delete, and identifying another portion of the data that has not been previously backed up as data to delete without back up; and
    deleting from the user mobile device the another portion of the data.

14. A computer program product comprising one or more computer readable storage media having program instructions collectively stored on the one or more computer readable storage media, the program instructions executable to:
    determining an amount of available storage in a user mobile device by analyzing the user mobile device;
    predict an amount of storage in the user mobile device that will be required for a future operation of the user mobile device, wherein the prediction is based on travel itineraries of a plurality of other user mobile devices;
    identify an amount of data stored on the user mobile device that has not been previously backed up to an external storage device, the external storage device being external to the user mobile device;

back up to an external backup device a portion of the data that has not been previously backed up, the external backup device being external to the user mobile device; and delete from the user mobile device the data that is backed up to the external backup device, wherein a sum of an amount of the data deleted and the amount of available storage in the user mobile device is greater than the predicted amount of storage, the external back up device is another mobile device, and the backing up is performed after the predicting and automatically while the user mobile device is wirelessly connected to the other mobile device.

15. The computer program product of claim 14, wherein the future operation is capturing an image.

16. The computer program product of claim 14, wherein the predicting is based on planned travel of a user of the user mobile device, and the planned travel of the user is obtained from a calendar in the user mobile device.

17. The computer program product of claim 14, wherein the future operation is at a location outside of any network that is connected to the Internet.

18. The computer program product of claim 14, wherein the program instructions are further executable to:

identify a portion of the data that has not been previously backed up as data to back up and delete, and identify another portion of the data that has not been previously backed up as delete without back up, wherein the identifying of the portion of the data and the another portion of the data is based on historical content deletion patterns and an object detection algorithm; and delete from the user mobile device the another portion of the data.

19. A system comprising:

a processor, a computer readable memory, one or more computer readable storage media, and program instructions collectively stored on the one or more computer readable storage media, the program instructions executable to:

determine an amount of available storage in a user mobile device by analyzing the user mobile device;

predict an amount of storage in the user mobile device that will be required for a future operation of the user mobile device, the future operation being at a location outside of any network that is connected to the Internet;

identify an amount of data stored on the user mobile device that has not been previously backed up to an external storage device, the external storage device being external to the user mobile device;

back up to an external backup device a portion of the data that has not been previously backed up based on an object detection algorithm that comprises a convolutional neural network long short-term memory (CNN-LSTM) algorithm, the external backup device being external to the user mobile device; and delete from the user mobile device the data that is backed up to the external backup device, wherein a sum of an amount of the data deleted and the amount of available storage in the user mobile device is greater than the predicted amount of storage, and the backing up is performed after the predicting.

20. The system of claim 19, wherein the future operation is capturing an image.

* * * * *